US011550567B2

(12) United States Patent
Copty et al.

(10) Patent No.: US 11,550,567 B2
(45) Date of Patent: Jan. 10, 2023

(54) USER AND ENTITY BEHAVIOR ANALYTICS OF INFRASTRUCTURE AS CODE IN PRE DEPLOYMENT OF CLOUD INFRASTRUCTURE

(71) Applicant: International Business Machines Corporation, Armonk, NY (US)

(72) Inventors: Fady Copty, Nazareth (IL); Omri Soceanu, Haifa (IL); Lev Greenberg, Haifa (IL); Dov Murik, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 17/221,801

(22) Filed: Apr. 4, 2021

(65) Prior Publication Data
US 2022/0318002 A1 Oct. 6, 2022

(51) Int. Cl.
*G06F 8/71* (2018.01)
*G06F 8/33* (2018.01)
*G06F 8/77* (2018.01)
*H04L 67/50* (2022.01)

(52) U.S. Cl.
CPC ............ *G06F 8/71* (2013.01); *G06F 8/33* (2013.01); *G06F 8/77* (2013.01); *H04L 67/535* (2022.05)

(58) Field of Classification Search
CPC ..... G06F 8/71; G06F 8/33; G06F 8/77; H04L 67/535
USPC ........................................................ 717/121
See application file for complete search history.

(56) References Cited

U.S. PATENT DOCUMENTS 10,255,370 B2 4/2019 Carpenter
2020/0358617 A1* 11/2020 Baierlein ............. H04L 9/3228

OTHER PUBLICATIONS

Kim et al., Monitoring and Detecting Abnormal Behavior in Mobile Cloud Infrastructure, 2012, IEEE, p. 1303-1310.*
Continuous monitoring with Azure Monitor, Oct. 12, 2018, Azure Monitor—Microsoft Docs, https://docs.microsoft.com/en-us/azure/azure-monitor/continuous-monitoring.
Akond Rahman, Jonathan Stallings, and Laurie Williams, Defect prediction metrics for infrastructure as code scripts in DevOps, May 2018, 2018 ACM/IEEE 40th International Conference on Software Engineering: Companion Proceedings.
Infrastructure as code, Oct. 2018, Google Cloud, https://cloud.google.com/solutions/infrastructure-as-code.
(Continued)

*Primary Examiner* — John Q Chavis
(74) *Attorney, Agent, or Firm* — Gregory J Kirsch

(57) ABSTRACT

The present invention relates to novel techniques for monitoring changes to source code of Infrastructure as Code systems to detect attempted anomalous changes and block such changes from the code. For example, a method may comprise learning a security architecture and history of an infrastructure as code system to be deployed in at least one cloud account, monitoring changes to source code of the infrastructure as code system that are made before deployment of the infrastructure as code system to detect an anomaly, determining whether the detected anomaly affects regulated resources of the infrastructure as code system, and blocking changes to the source code of the infrastructure as code system that produce the detected anomaly that affects regulated resources of the infrastructure as code system.

20 Claims, 3 Drawing Sheets

(56) References Cited

OTHER PUBLICATIONS

Sean Porter, Infrastructure as code: testing and monitoring, May 23, 2019, Sensu, https://sensu.io/blog/infrastructure-as-code-testing-and-monitoring.

Roy Feintuch, New Security Challenges with Infrastructure-as-Code and Immutable Infrastructure, Apr. 4, 2018, The NewStack, https://thenewstack.io/new-security-challenges-with-infrastructure-as-code-and-immutable-infrastructure/.

Chaitanya Jawale, Securing Infrastructure as Code, Oct. 14, 2020, Opcito, https://www.opcito.com/blogs/securing-infrastructure-as-code/.

W. Chen, G. Wu and J. Wei, "An Approach to Identifying Error Patterns for Infrastructure as Code," 2018 IEEE International Symposium on Software Reliability Engineering Workshops (ISSREW), Memphis, TN, 2018, pp. 124-129, doi: 10.1109/ISSREW.2018.00-19.

Li et al., Gandalf: An Intelligent, End-To-End Analytics Service for Safe Deployment in Large-Scale Cloud Infrastructure, Feb. 25-27, 2020, Proceedings of the 17th USENIX Symposium on Networked Systems Design and Implementation, https://www.usenix.org/conference/nsdi20/presentation/li.

Get behavioral analytics and anomaly detection, Mar. 2021, Microsoft, https://docs.microsoft.com/en-us/cloud-app-security/anomaly-detection-policy.

\* cited by examiner

USER AND ENTITY BEHAVIOR ANALYTICS OF INFRASTRUCTURE AS CODE IN PRE DEPLOYMENT OF CLOUD INFRASTRUCTURE

BACKGROUND

The present invention relates to novel techniques for monitoring changes to source code of Infrastructure as Code systems to detect attempted anomalous changes and block such changes from the code or alert to attempts to make such changes to the code.

User and Entity Behavior Analytics (UBA) is a domain that answers many regulation controls requirements, that are focused at change management of highly sensitive resources. Infrastructure as Code (IaC) is the technique of managing and provisioning computer data centers through machine-readable definition files, rather than physical hardware configuration or interactive configuration tools. Thus, IaC defines the cloud infrastructure, including highly sensitive resources and privileged users. These resources and user are subject to regulation controls, and thus should be monitored.

Conventionally, changes in IaC code are manually inspected for compliance with regulation controls before the changed code is deployed. Manually checking for changes is a highly complex task that consumes a lot of manual effort and is error-prone. Further, existing tools provide only partial solutions to security risks related to the changes to IaC.

Thus, a need arises for techniques to monitor resources and users during the pre-deployment phase by checking changes to the infrastructure as code (IaC) in an automated way.

SUMMARY

Embodiments may include novel techniques for monitoring resources and users during the pre-deployment phase by checking changes to the infrastructure as code (IaC) in an automated way. Typically, IaC systems may include a code implementation/code deployment (CICD) pipeline, as well as the surrounding system environment of the CI/CD pipeline that affects the IaC semantics.

Embodiments may monitor for changes in key features of the IaC, and propagate them into models of the infrastructure, and anomaly detection mechanism in order to detect suspicious changes. Embodiments may build models of the infrastructure based on IaC, and propagate changes into the models to detect how a change can affect the infrastructure. Embodiments may learn the standard state of a feature from the history of commits to a code repository, as well as the user activity in post-deployment. Embodiments may monitor the changes in the code repository, and create alerts of regulated changes that are then used as an alert or warning, or a blocking error for the code implementation/code deployment (CICD) pipeline. Embodiments may monitor the CI pipeline, the CD pipeline, or the combined CI/CD pipeline.

For example, in an embodiment, a method may be implemented in a computer system comprising a processor, memory accessible by the processor, and computer program instructions stored in the memory and executable by the processor, the method may comprise learning a security architecture and history of an infrastructure as code system to be deployed in at least one cloud account, monitoring changes to source code of the infrastructure as code system that are made before deployment of the infrastructure as code system to detect an anomaly, determining whether the detected anomaly affects regulated resources of the infrastructure as code system, and blocking changes to the source code of the infrastructure as code system that produce the detected anomaly that affects regulated resources of the infrastructure as code system.

In embodiments, learning the security architecture and history of the infrastructure as code system may comprise generating a model of the security architecture of the infrastructure as code system based on access policies, resource groups, security groups, and network policies, of the infrastructure as code system and learning historical features of the of the infrastructure as code system based on changes made to the source code of the infrastructure as code system over the life of the infrastructure as code system, user activities occurring during operation of the at least one cloud account, and run-time activity on the at least one cloud account. The user activities may comprise at least one of user standard activity time, user standard geolocation, and user standard activity volume. Learning historical features may comprise learning a standard state of the infrastructure as code system based on at least one of user-lists, resources use, IP-lists, and resource configuration. The method may further comprise propagating the detected anomaly into the model of the security architecture of the infrastructure as code system.

In an embodiment, a system may comprise a processor, memory accessible by the processor, and computer program instructions stored in the memory and executable by the processor to perform learning a security architecture and history of an infrastructure as code system to be deployed in at least one cloud account, monitoring changes to source code of the infrastructure as code system that are made before deployment of the infrastructure as code system to detect an anomaly, determining whether the detected anomaly affects regulated resources of the infrastructure as code system, and blocking changes to the source code of the infrastructure as code system that produce the detected anomaly that affects regulated resources of the infrastructure as code system.

In an embodiment, a computer program product may comprise a non-transitory computer readable storage having program instructions embodied therewith, the program instructions executable by a computer, to cause the computer to perform a method comprising learning a security architecture and history of an infrastructure as code system to be deployed in at least one cloud account, monitoring changes to source code of the infrastructure as code system that are made before deployment of the infrastructure as code system to detect an anomaly, determining whether the detected anomaly affects regulated resources of the infrastructure as code system, and blocking changes to the source code of the infrastructure as code system that produce the detected anomaly that affects regulated resources of the infrastructure as code system.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may include novel techniques for monitoring resources and users during the pre-deployment phase by checking changes to the infrastructure as code system (IaC) in an automated way. Typically, IaC systems may include a code implementation/code deployment (CICD) pipeline, as well as the surrounding system environment of the CI/CD pipeline that affects the IaC semantics.

Embodiments may monitor for changes in key features of the IaC, and propagate them into models of the infrastructure, and anomaly detection mechanism in order to detect suspicious changes. Embodiments may build models of the infrastructure based on IaC, and propagate changes into the models to detect how a change can affect the infrastructure. Embodiments may learn the standard state of a feature from the history of commits to a code repository, as well as the user activity in post-deployment. Embodiments may monitor the changes in the code repository, and create alerts of regulated changes that are then used as an alert or warning, or a blocking error for the code implementation/code deployment (CICD) pipeline. Embodiments may monitor the CI pipeline, the CD pipeline, or the combined CI/CD pipeline.

Figure 1:
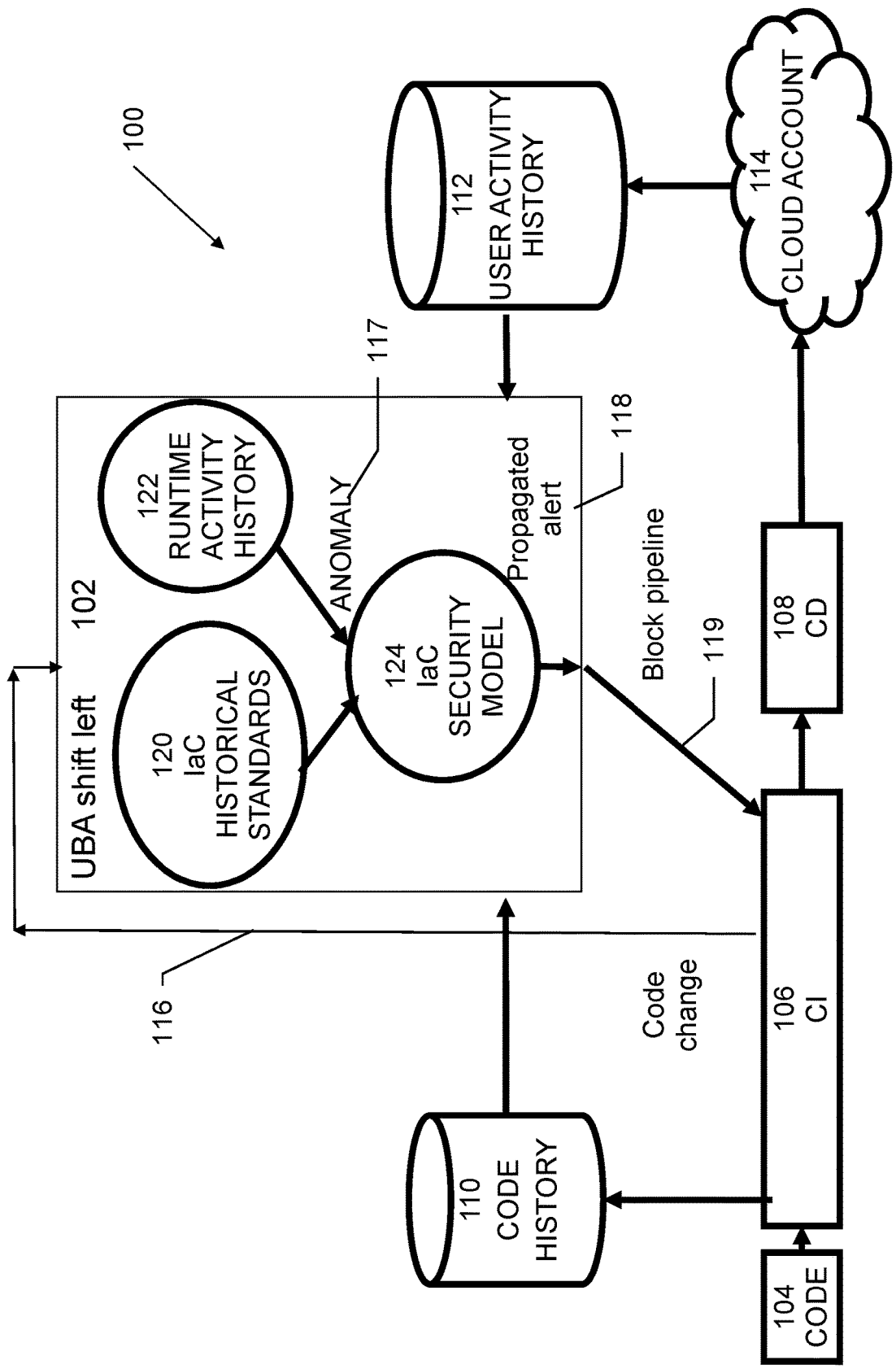
FIG. 1 is an exemplary block diagram of an Infra structure as Code (IaC) monitoring and analytics architecture according to embodiments of the present techniques.

An exemplary Infra structure as Code (IaC) monitoring and analytics architecture 100, in accordance with embodiments of the present techniques, is shown in FIG. 1. Architecture 100 may include User and Entity Behavior Analytics (UBA) block 102, code pipeline 104, 106, 108, code history repository 110, user activity history repository 112, and cloud account 114. Code pipeline 104, 106, 108 may include code 104, such as IaC source code. Code 104 may be input to code implementation (CI) block 106, in which the input source code 104 may be modified. These source code changes 116 may be captured over the life of the infrastructure as code system in code history repository 110 and may be sent to UBA block 102 for learning and/or monitoring. If UBA block 102 detects an anomaly 117 in code changes 116, UBA block 102 may propagate an alert 118 to be notified to a user or administrator of the system and/or to block 119 CI block 106 of the pipeline from sending the modified code to code deployment (CD) block 108. When code is sent to CD block 108, the code may be deployed in cloud account 114. User activity history repository 112 may gather information about user activities during operation of cloud account 114 and information contained therein may be sent to UBA block 102. UBA block 102 may include IaC historical standards block 120, runtime activity history block 122, and IaC security model 124.

Figure 2:
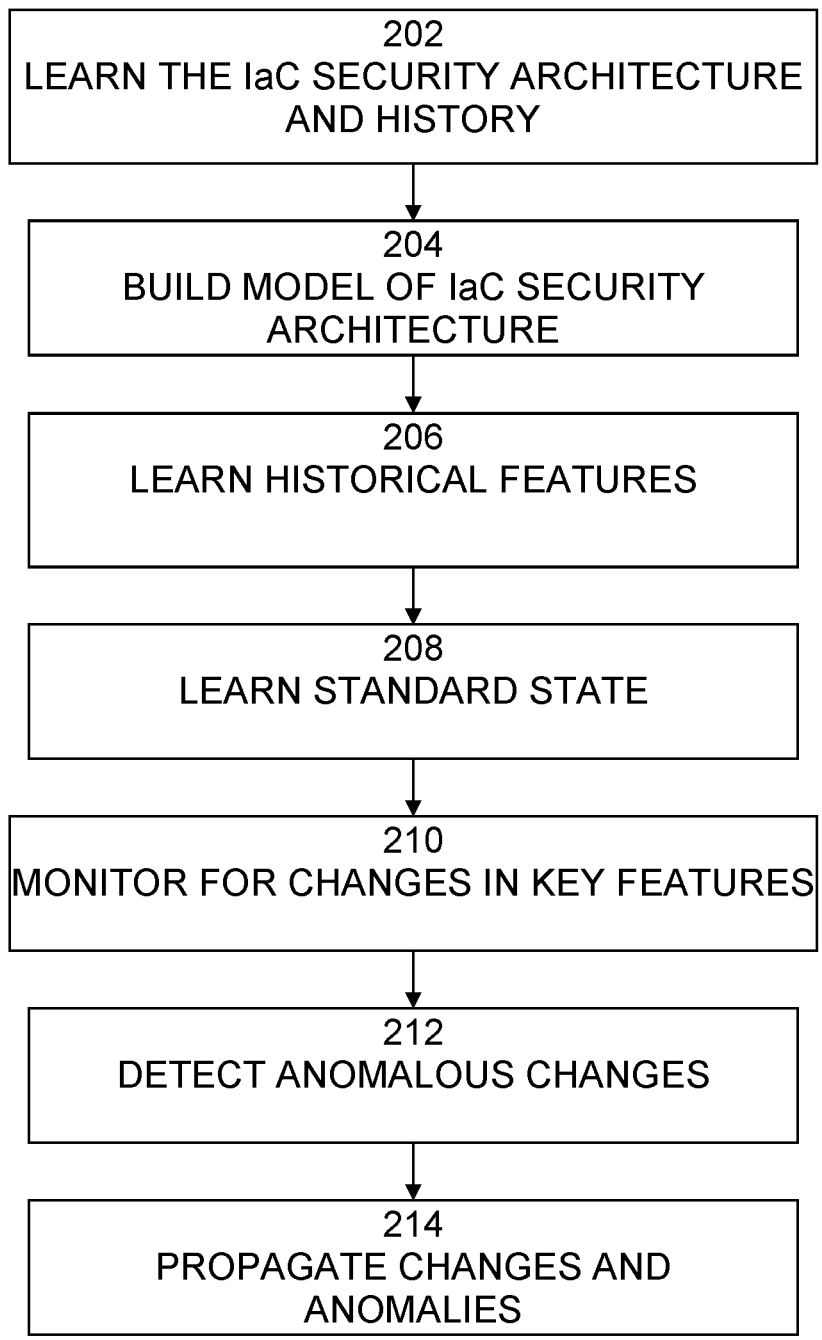
FIG. 2 is an exemplary flow diagram of a process of IaC monitoring and analytics, according to embodiments of the present techniques.

An exemplary flow diagram of a process of IaC monitoring and analytics is shown in FIG. 2. It is best viewed in conjunction with FIG. 1. Process 200 may begin with 202, in which the IaC security architecture and history may be learned as in 204-208. At 204, a model 124 of the IaC security architecture may be built and may include features such as access policies, resource groups, security groups, network policies, etc. At 206, historical features may be learned from, for example, code history repository 110, user activity history repository 112, and run-time activity on the actual cloud account 114, and may be stored at runtime activity history block 122. Such historical features may include, for example, user standard activity time, user standard geolocation, user standard activity volume, etc. At 208, the standard state of the system may be learned from the IaC history for example, code history repository 110, user activity history repository 112, and may be stored at IaC historical standards block 120. The standard state may include features such as user-lists, resources use, IP-lists (whitelists, blacklists, etc.), resource configurations, etc.

At 210, the process may monitor for changes 116 in key features of the IaC. Such features may include, for example, user lists, IP-whitelists, authorization policies, etc. At 212, anomalous changes 117 in the IaC may be detected according to learned models such as IaC historical standards block 120 and runtime activity history block 122. At 214, the changes and anomalies 117 may be propagated 118 in the IaC security model 124 to detect if these changes affect regulated resources. For example, if usually only 2 IP addresses appear in an IP whitelist, and the system detects that 50 IP addresses were added, an anomaly would be detected. If an anomaly is detected, alert 118 may be notified to a user or administrator of the system and/or propagated to block 119 CI block 106 of the pipeline from sending the modified code to code deployment (CD) block 108.

Figure 3:
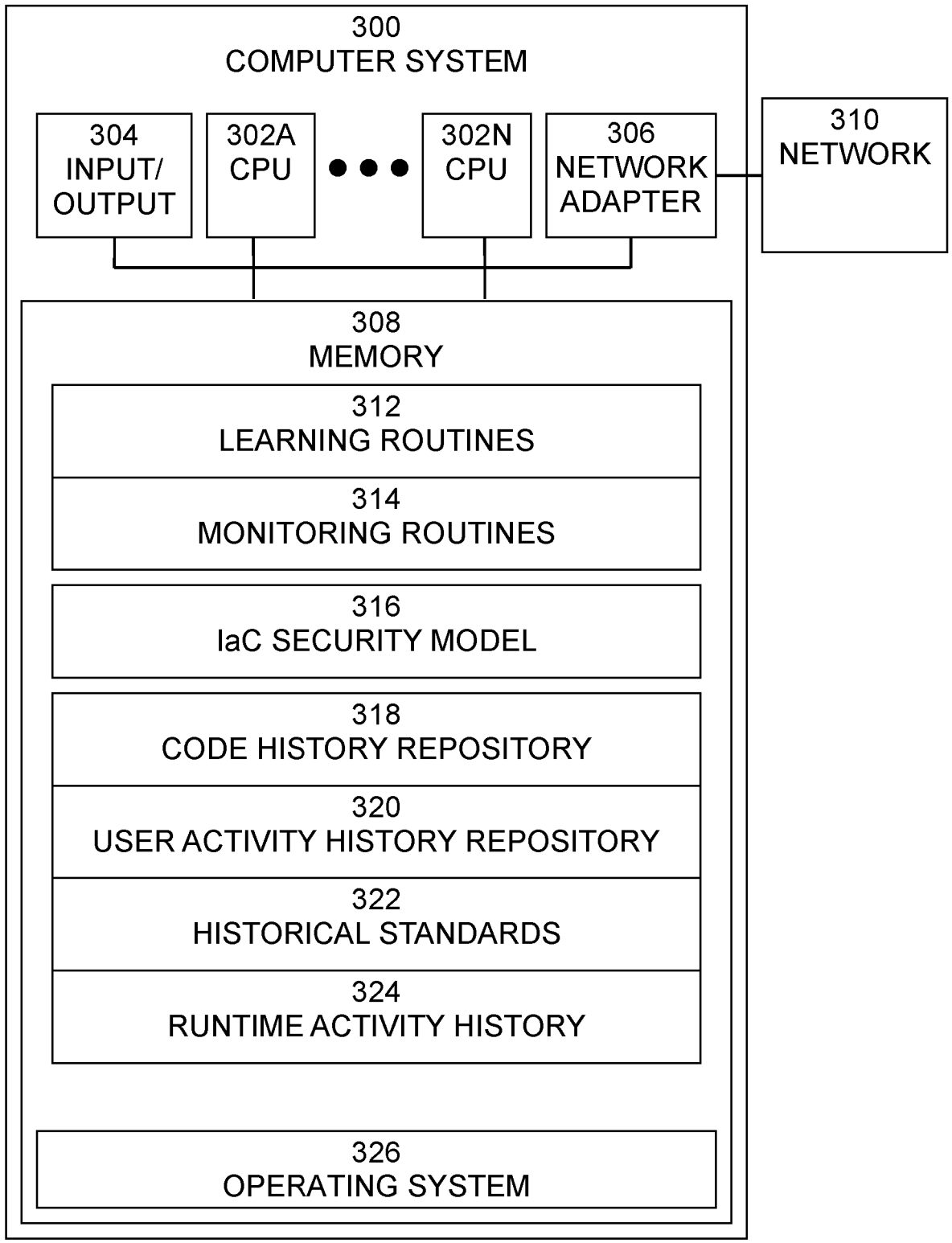
FIG. 3 is an exemplary block diagram of a computer system, in which processes involved in the embodiments described herein may be implemented.

An exemplary block diagram of a computer system 300, in which processes involved in the embodiments described herein may be implemented, is shown in FIG. 3. Computer system 300 may be implemented using one or more programmed general-purpose computer systems, such as embedded processors, systems on a chip, personal computers, workstations, server systems, and minicomputers or mainframe computers, or in distributed, networked computing environments. Computer system 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 3, memory 308 may include learning routines 312, monitoring routines 314, IaC security model 316, code history repository 318, user activity history repository 320, historical standards block 322, runtime activity history block 324, and operating system 326. learning routines 312 may include software routines to learn the IaC security architecture and history, as described above. Monitoring routines 314 may include software routines to monitor for changes in key features of the IaC, as described above. IaC security model 316 may include software routines and data to model the IaC security architecture, as described above. Code history repository 318 may include software routines and data to capture changes to the IaC code, as described above. User activity history repository 320 may include software routines and data to gather information about user activities during operation of cloud account, as described above. Historical standards block 322 may include software routines and data to learn a standard state of the IaC system, as described above. Runtime activity history block 324 may include software routines and data to learn historical features of the IaC system, as described above. Operating system 324 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising:
    learning a security architecture and history of an infrastructure as code system to be deployed in at least one cloud account;
    monitoring changes to source code of the infrastructure as code system that are made before deployment of the changed source code to detect an anomaly; and
    determining whether the detected anomaly affects regulated resources of the infrastructure as code system.

2. The method of claim 1, wherein learning the security architecture and history of the infrastructure as code system comprises:
    generating a model of the security architecture of the infrastructure as code system based on access policies, resource groups, security groups, and network policies, of the infrastructure as code system; and
    learning historical features of the of the infrastructure as code system based on changes made to the source code of the infrastructure as code system over the life of the infrastructure as code system, user activities occurring during operation of the at least one cloud account, and run-time activity on the at least one cloud account.

3. The method of claim 2, wherein the user activities comprise at least one of user standard activity time, user standard geolocation, and user standard activity volume.

4. The method of claim 3, wherein learning historical features comprises learning a standard state of the infrastructure as code system based on at least one of user-lists, resources use, IP-lists, and resource configuration.

5. The method of claim 4, further comprising, when it is determined that the detected anomaly affects regulated resources of the infrastructure as code system, blocking changes to the source code of the infrastructure as code system that produce the detected anomaly that affects regulated resources of the infrastructure as code system.

6. The method of claim 4, further comprising, when it is determined that the detected anomaly affects regulated resources of the infrastructure as code system, generating an alert related to the changes to the source code of the infrastructure as code system that produce the detected anomaly that affects regulated resources of the infrastructure as code system.

7. The method of claim 2, further comprising:
    propagating the detected anomaly into the model of the security architecture of the infrastructure as code system.

8. A system comprising a processor, memory accessible by the processor, and computer program instructions stored in the memory and executable by the processor to perform:
    learning a security architecture and history of an infrastructure as code system to be deployed in at least one cloud account;

monitoring changes to source code of the infrastructure as code system that are made before deployment of the changed source code to detect an anomaly; and determining whether the detected anomaly affects regulated resources of the infrastructure as code system.

9. The system of claim 8, wherein learning the security architecture and history of the infrastructure as code system comprises:

generating a model of the security architecture of the infrastructure as code system based on access policies, resource groups, security groups, and network policies, of the infrastructure as code system; and learning historical features of the of the infrastructure as code system based on changes made to the source code of the infrastructure as code system over the life of the infrastructure as code system, user activities occurring during operation of the at least one cloud account, and run-time activity on the at least one cloud account.

10. The system of claim 9, wherein the user activities comprise at least one of user standard activity time, user standard geolocation, and user standard activity volume.

11. The system of claim 10, wherein learning historical features comprises learning a standard state of the infrastructure as code system based on at least one of user-lists, resources use, IP-lists, and resource configuration.

12. The system of claim 11, further comprising, when it is determined that the detected anomaly affects regulated resources of the infrastructure as code system, blocking changes to the source code of the infrastructure as code system that produce the detected anomaly that affects regulated resources of the infrastructure as code system.

13. The system of claim 11, further comprising, when it is determined that the detected anomaly affects regulated resources of the infrastructure as code system, generating an alert related to the changes to the source code of the infrastructure as code system that produce the detected anomaly that affects regulated resources of the infrastructure as code system.

14. The system of claim 9, further comprising:

propagating the detected anomaly into the model of the security architecture of the infrastructure as code system.

15. A computer program product comprising a non-transitory computer readable storage having program instructions embodied therewith, the program instructions executable by a computer, to cause the computer to perform a method comprising:

learning a security architecture and history of an infrastructure as code system to be deployed in at least one cloud account;

monitoring changes to source code of the infrastructure as code system that are made before deployment of the infrastructure as code system to detect an anomaly;

determining whether the detected anomaly affects regulated resources of the infrastructure as code system; and blocking changes to the source code of the infrastructure as code system that produce the detected anomaly that affects regulated resources of the infrastructure as code system.

16. The computer program product of claim 15, wherein learning the security architecture and history of the infrastructure as code system comprises:

generating a model of the security architecture of the infrastructure as code system based on access policies, resource groups, security groups, and network policies, of the infrastructure as code system; and learning historical features of the of the infrastructure as code system based on changes made to the source code of the infrastructure as code system over the life of the infrastructure as code system, user activities occurring during operation of the at least one cloud account, and run-time activity on the at least one cloud account.

17. The computer program product of claim 16, wherein the user activities comprise at least one of user standard activity time, user standard geolocation, and user standard activity volume.

18. The computer program product of claim 17, wherein learning historical features comprises learning a standard state of the infrastructure as code system based on at least one of user-lists, resources use, IP-lists, and resource configuration.

19. The computer program product of claim 18, further comprising, when it is determined that the detected anomaly affects regulated resources of the infrastructure as code system, blocking changes to the source code of the infrastructure as code system that produce the detected anomaly that affects regulated resources of the infrastructure as code system.

20. The computer program product of claim 18, further comprising, when it is determined that the detected anomaly affects regulated resources of the infrastructure as code system, generating an alert related to the changes to the source code of the infrastructure as code system that produce the detected anomaly that affects regulated resources of the infrastructure as code system.

\* \* \* \* \*